United States Patent
Sundaram et al.

(10) Patent No.: US 10,029,205 B2
(45) Date of Patent: Jul. 24, 2018

(54) TWO STAGE ADSORBENT AND PROCESS CYCLE FOR FLUID SEPARATIONS

(71) Applicant: ExxonMobil Research and Engineering Company, Annandale, NJ (US)

(72) Inventors: Narasimhan Sundaram, Annandale, NJ (US); Hans Thomann, Bedminster, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 77 days.

(21) Appl. No.: 15/258,076

(22) Filed: Sep. 7, 2016

(65) Prior Publication Data

US 2017/0087503 A1 Mar. 30, 2017

Related U.S. Application Data

(60) Provisional application No. 62/232,705, filed on Sep. 25, 2015.

(51) Int. Cl.
*B01D 53/04* (2006.01)
*B01J 20/04* (2006.01)

(52) U.S. Cl.
CPC ..... *B01D 53/0462* (2013.01); *B01D 53/0407* (2013.01); *B01D 53/0431* (2013.01);
(Continued)

(58) Field of Classification Search
CPC ............ B01D 53/0462; B01D 53/0407; B01D 53/0431; B01D 53/0446; B01D 2253/25;
(Continued)

(56) References Cited

U.S. PATENT DOCUMENTS 6,059,863 A * 5/2000 Monereau .......... B01D 53/0431
96/132
7,094,275 B2 8/2006 Keefer et al.
(Continued)

FOREIGN PATENT DOCUMENTS

EP 2832419 A1 * 2/2015

OTHER PUBLICATIONS

McDonald et al., "Cooperative Insertion of $CO_2$ in Diamine Appended Metal-Organic Frameworks", Nature, Mar. 19, 2015, pp. 303-308, vol. 519, Nature.com.
(Continued)

*Primary Examiner* — Frank Lawrence
(74) *Attorney, Agent, or Firm* — Andrew T. Ward

(57) ABSTRACT

In various aspects, apparatuses, systems, and methods are provided for performing two stage separation of $CO_2$ from a gaseous stream. The first stage adsorbent can be comprised of a plurality of cylindrical or substantially cylindrical rings. The first stage adsorbent can be comprised of a metal organic framework. The second stage adsorbent can be subject to a displacement desorption process. The second stage adsorbent can be comprised of a support and a metal compound selected from the group consisting of alkali or alkaline earth. The first and second stage adsorbent can be arranged concentrically for space and efficiency considerations.

26 Claims, 3 Drawing Sheets

(52) U.S. Cl.
CPC .... *B01D 53/0446* (2013.01); *B01D 2253/204* (2013.01); *B01D 2253/25* (2013.01); *B01D 2257/504* (2013.01); *B01D 2259/4009* (2013.01); *B01D 2259/414* (2013.01); *B01J 20/04* (2013.01); *Y02C 10/08* (2013.01)

(58) Field of Classification Search
CPC ........ B01D 2253/204; B01D 2257/504; B01D 2259/4009; B01D 2259/414; B01J 20/04; B01J 20/226; Y02C 10/08
USPC ............................... 95/139, 148; 96/132, 154
See application file for complete search history.

(56) References Cited

U.S. PATENT DOCUMENTS

| | | | |
|---|---|---|---|
| 7,556,671 B2 * | 7/2009 | Jain | B01D 53/02 95/135 |
| 8,500,854 B1 * | 8/2013 | Pennline | B01D 53/0462 95/117 |
| 8,784,533 B2 | 7/2014 | Leta et al. | |
| 8,900,347 B2 | 12/2014 | Boulet et al. | |
| 2003/0205130 A1 * | 11/2003 | Neu | B01D 53/0431 95/90 |
| 2006/0169142 A1 | 8/2006 | Rode et al. | |
| 2008/0282892 A1 | 11/2008 | Deckman et al. | |
| 2015/0008366 A1 * | 1/2015 | Elliott | B01J 20/043 252/184 |
| 2015/0298044 A1 | 10/2015 | Sato et al. | |
| 2017/0136401 A1 * | 5/2017 | Sundaram | F01N 3/0857 |

OTHER PUBLICATIONS

McDonald et al., "Capture of Carbon Dioxide From Air and Flue Gas in the Alkylamine-Appended Metal-Organic Framework mmem-Mg2(dobpdc)", Journal of the American Chemical Society, Apr. 4, 2012, pp. 7056-7065, vol. 134, iss. 16, ACS Publications.
PCT/US2016/050505 International Search Report and Written Opinion dated Jan. 20, 2017.
Wilcox, "Chapter 4: Adsorption Table 4.6", Carbon Capture, 2012, p. 160, Springer-Verlag New York.

* cited by examiner

TWO STAGE ADSORBENT AND PROCESS CYCLE FOR FLUID SEPARATIONS

CROSS REFERENCE TO RELATED APPLICATIONS

This application claims priority to U.S. Provisional Application Ser. No. 62/232,705 filed on Sep. 25, 2015, herein incorporated by reference in its entirety.

FIELD

Systems and methods are provided for improving the efficiency of adsorbents during adsorption processes.

BACKGROUND

Gas separation is important in many industries and can typically be accomplished by flowing a mixture of gases over an adsorbent that preferentially adsorbs a more readily adsorbed component relative to a less readily adsorbed component of the mixture. Fossil fuels currently supply the majority of the world's energy needs and their combustion is the largest source of anthropogenic carbon dioxide emissions. Carbon dioxide is a greenhouse gas and is believed to contribute to global climate change. Concern over global climate warming has led to interest in capturing $CO_2$ emissions from the combustion of fossil fuels. $CO_2$ can be removed from combustion flue gas streams by varying methods.

Combustion gases vary in composition depending on the fuel and the conditions of combustion. The combustion gases can be produced in furnaces and in gas turbines, including the combustion gases produced in the generation of electric power. The fuels used are predominantly coal and natural gas. Coal is burned in furnaces, while natural gas is burned both in furnaces and in gas turbines, but in electric power generation natural gas is mainly burned in gas turbines.

The quantities of combustion gas produced in electric power generation are very large because of the scale of furnaces and turbines used. One measure of the scale of these operations is the amount of $CO_2$ produced in a typical 500 Megawatt power plant. For coal fired power generation, the rate of $CO_2$ production is on the order of 100 kilograms per second; for gas fired power production it is more like 50 kilograms per second.

The challenge for flue gas $CO_2$ capture is to do it efficiently to minimize the cost. All post-combustion $CO_2$ capture technologies suffer from the disadvantage that the $CO_2$ in the flue gas is present at low pressure (just about 1 atm) and in low concentrations (3 to 15%). A large amount of energy is needed to separate the $CO_2$. For 90% recovery of 10% $CO_2$ in a flue gas at 1 atm, the $CO_2$ must be brought from 0.1 atm to 1 atm, and then further compressed to a delivery pressure of 150 atm. Analyses conducted at NETL shows that $CO_2$ capture and compression using a conventional absorption process raises the cost of electricity from a newly built supercritical PC power plant by 86%, from 64 cents/kWh to 118.8 cents/kWh (Julianne M. Klara, DOE/NETL-2007/1281, Revision 1, August 2007, Exhibit 4-48 LCOE for PC Cases). Aqueous amines are considered a state-of-the-art technology for $CO_2$ capture for PC power plants, but have a cost of $68/ton of $CO_2$ avoided) (Klara 2007, DOE/NETL-2007/1282). Developing methods that minimize the amount of energy and other costs will be necessary if $CO_2$ removal from flue gas is to be economical.

Methods for the removal of $CO_2$ from gas streams, include adsorption with a solvent, adsorption with a sorbent, membrane separation, and cryogenic fractionation and combinations thereof. In absorption/desorption processes to capture $CO_2$, the energy needed to regenerate the sorbent or solvent is a large cost element.

One of the more important gas separation techniques is temperature swing adsorption (TSA). TSA processes also rely on the fact that under pressure gases tend to be adsorbed within the pore structure of the microporous adsorbent materials or within the free volume of a polymeric material. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components in a gas mixture. TSA processes are generally preferred when the adsorbate concentration in the feed is less than 10%, although TSA processes can be used at greater percentages. See Jennifer Wilcox, CARBON CAPTURE, Table 4.6, 160 (Springer 2012).

Another important gas separation technique is known as a displacement purge or displacement desorption ("DD"). In the DD cycle the displacement purge fluid in the regeneration step adsorbs nearly as strongly as the adsorbate so that desorption is favored by both change in partial pressure and competitive adsorption through the displacement of surface-bound $CO_2$. Typical cycle times are on the order of several minutes. In this process since the heat of adsorption of the displacement purge fluid, normally steam, is approximately equal to that of the adsorbate, the net heat generated or consumed is essentially negligible, maintaining nearly isothermal conditions throughout the process, which allows for higher sorbent loading compared to an inert-purge process. DD processes are generally preferred when the adsorbate concentration in the feed is greater than 10%, although DD processes are used at lesser percentages. See Jennifer Wilcox, CARBON CAPTURE, Table 4.6, 160 (Springer 2012).

Conventional swing adsorption processes suffer a variety of drawbacks. Specifically, in both TSA and DD processes, the ratio of steam required to the amount of $CO_2$ recovered is oftentimes at an economically inefficient/unacceptable level, e.g. between 3 to 10 moles of steam usage per mole of $CO_2$ recovered. There is a need for energy efficient removal of carbon dioxide from low pressure flue gas with existing adsorbents.

U.S. Pat. No. 8,900,347 describes a temperature swing adsorption apparatus. The apparatus includes axial thermally conductive filaments that can assist with heating and/or cooling of the adsorbent.

U.S. Pat. No. 8,784,533 describes a temperature and/or pressure swing adsorption process using a solid adsorbent, such as an adsorbent provided as a parallel channel contactor. The temperature of the solid adsorbent can be controlled by introducing a heating and/or cooling fluid through heating and/or cooling channels in the adsorbent that are not in fluid communication with the channels that provide the feed gas for separation. This can allow physical contact between the heating and/or cooling fluid without exposing the gas being separated to the fluid.

U.S. Publication No. 2015/0008366 A1 describes a displacement process an essentially isothermal cyclic adsorption process, and is incorporated herein by reference in its entirety. A driving force for adsorption and desorption/regeneration of the $CO_2$ can be a combination of concentration swing and desorptive displacement/adsorption. During adsorption, incoming $CO_2$ molecules adsorb onto the sorbent and also displace previously adsorbed water (adsorptive displacement or displacement adsorption), during which time the water also desorbs by concentration swing. During desorption/regeneration, the water molecules from the steam adsorb onto the adsorbent and displace the $CO_2$ (desorptive displacement or displacement desorption). The DD process utilizes an adsorbent composed of a support and a metal compound selected from the group consisting of alkali and alkaline earth.

Thomas M. McDonald et al., *Cooperative Insertion of $CO_2$ In Diamine-Appended Metal-Organic Frameworks*, 519 NATURE 303 (2015) and Thomas M. McDonald et al., *Capture of Carbon Dioxide From Air and Flue Gas In the Alkylamine-Appended Metal-Organic Framework mmem-$Mg_2(dobpdc)$*, 134 J. AM. CHEM. SOC. 7056 (2012) describe the use of metal organic frameworks (MOFs) in temperature swing adsorption processes.

SUMMARY

In various aspects, apparatuses, systems, and methods are provided for performing two stage separation of $CO_2$ from a gaseous stream. In one aspect, a first stage adsorbent is provided. In another aspect, the first stage adsorbent can be comprised of a plurality of cylindrical or substantially cylindrical rings. In the context of this application, "substantially cylindrical" is intended to include any type of prismatic shape, for example, a polyhedron with two polygonal faces lying in parallel planes and with the other faces being parellelograms. The first stage adsorbent can be comprised of a MOF. In another aspect, a second stage adsorbent is provided. The second stage adsorbent can be subject to a DD process. The second stage adsorbent can be comprised of a support and a metal compound selected from the group consisting of alkali or alkaline earth.

In another aspect, the first stage adsorbent is disposed radially about a central axis. In another aspect, the first stage adsorbent has an interior surface that is a distance x from the central axis and an exterior surface that is a distance y from the central axis, wherein y is greater than x, thereby forming a void space between the central axis and the interior surface of the first stage adsorbent. In another aspect, the second stage adsorbent is likewise disposed radially about a central axis. In another aspect, the second stage adsorbent is disposed radially about the same central axis of the first stage adsorbent. In another aspect, the second stage adsorbent is disposed with the void space of the first stage adsorbent.

In one aspect, a method for separation of $CO_2$ from a gaseous stream is provided. In another aspect, the method comprises contacting the gaseous stream with a first stage steam sensitive adsorbent such that $CO_2$ is adsorbed into the first stage adsorbent and a first $CO_2$-lean stream is formed. In another aspect, the method comprises desorbing $CO_2$ from the first stage adsorbent thereby forming a first $CO_2$-rich stream. In one aspect, the $CO_2$ content of the gaseous stream is between 3-20 mol. %. In another aspect, the $CO_2$ content of the first $CO_2$-rich stream is about 20-35 mol. %. In another aspect, the method comprises contacting the first $CO_2$-rich stream with a second stage steam insensitive adsorbent such that $CO_2$ is adsorbed in the second stage adsorbent and a second $CO_2$-lean stream is formed. In another aspect, the method comprises desorbing $CO_2$ from the second stage adsorbent thereby forming a second $CO_2$-rich stream; wherein the second $CO_2$-rich stream has a higher $CO_2$ concentration by mol. % than the first $CO_2$-rich stream.

In another aspect, the contacting the gaseous stream and the desorbing $CO_2$ from the first stage adsorbent steps are performed using a TSA process. In another aspect, the temperature swing process comprises contacting the gaseous stream with the first stage adsorbent at a first temperature, said first temperature being less than an adsorption temperature of $CO_2$ for the first stage adsorbent, heating the first stage adsorbent with a hot purge gas, wherein the hot purge gas is at a second temperature, said second temperature being greater than a desorption temperature of $CO_2$ for the first stage adsorbent. In another aspect of the TSA process the hot purge gas comprises $N_2$, $CO_2$, or flare gas, such as methane. In another aspect of the TSA process, the temperature differential between the first temperature and the second temperature is less than 90° C., less than 70° C., less than 50° C., less than 30° C., or less than 20° C. In another aspect, the first stage adsorbent is heated by the hot purge gas by indirect heat exchange.

In another aspect, the contacting the first $CO_2$-rich stream and the desorbing $CO_2$ from the second stage adsorbent steps are performed using a displacement process. In another aspect, the displacement process comprises, contacting the first $CO_2$-rich stream with the second stage adsorbent such that $CO_2$ is adsorbed into the second stage adsorbent; and contacting the second stage adsorbent with steam such that $CO_2$ is desorbed from the second stage adsorbent. In another aspect, $CO_2$ is desorbed from the second stage adsorbent via one or both of concentration swing and displacement desorption. In another aspect, the displacement process is conducted at an initial temperature; wherein the initial temperature does not vary more than 10° C. during the contacting the first $CO_2$-rich stream with the second stage adsorbent and the contacting the second stage adsorbent with steam steps.

In another aspect, the temperature swing process and displacement process described above are used as the first and second stage adsorption/desorption processes, respectively. In another aspect, the ratio of steam usage in moles to $CO_2$ desorbed in moles is less than 3. In another aspect, the heat of condensation from the $CO_2$ that is desorbed from the second stage adsorbent is used to heat the gaseous stream.

DETAILED DESCRIPTION OF THE EMBODIMENTS

Overview

Figure 1:
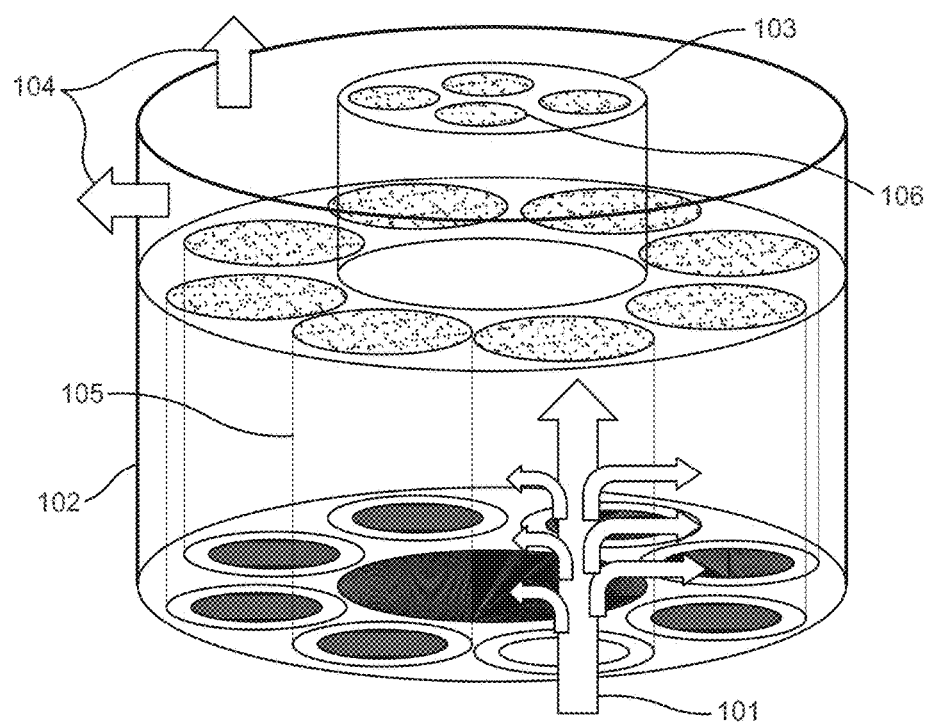
FIG. 1 shows an isometric view of an apparatus embodying aspects of the current disclosure.

As discussed above, both TSA and DD processes have shortcomings in terms of steam usage required to achieve the level of $CO_2$ separation that is required from gaseous streams. The term "steam usage" is a term known to those skilled in the art. It does not refer only to steam directly flowing over the adsorbent, but also is used to describe steam used for any heating that is required during adsorption processes. Indeed, many known adsorbents in degrade if exposed to steam. If an adsorbent degrades in the presence of steam, then it is said to be "steam sensitive." On the other hand, if an adsorbent is "steam insensitive" then it is understood to be able to generally withstand direct steam without degradation of its adsorption characteristics. This is not to say that a "steam insensitive" adsorbent would never degrade in the presence of steam, but rather, would not degrade beyond that which would be expected by a "steam sensitive" adsorbent under a purge gas other than steam.

Temperature Swing Adsorption Processes

Swing adsorption processes can have an adsorption step in which a feed mixture (typically in the gas phase) is flowed over an adsorbent that can preferentially adsorb a more readily adsorbed component relative to a less readily adsorbed component. A component may be more readily adsorbed because of kinetic or equilibrium properties of the adsorbent. The adsorbent is typically contained in a contactor that is part of the swing adsorption unit. In some aspects, a plurality of contactors can be used as part of a swing adsorption system. This can allow adsorption and desorption to be performed as a continuous process, with one or more contactors being used for adsorption while one or more additional contactors are used for desorption. As contactors approach maximum loading during adsorption and/or approach complete desorption under the desorption conditions, the flows to the contactors can be switched between adsorption and desorption. It is noted that after the desorption step, the adsorbent may retain a substantial loading of the gas component. In various aspects, the loading of the adsorbent with the adsorbed gas component at the end of the desorption step can be at least about 0.1 mol/kg, or at least about 0.2 mol/kg, or at least about 0.5 mol/kg, or at least about 1.0 mol/kg, and/or about 3.0 mol/kg or less, or about 2.5 mol/kg or less, or about 2.0 mol/kg or less, or about 1.5 mol/kg or less. Additionally or alternately, the loading at the end of the desorption step can be characterized relative to the loading at the end of the prior adsorption step. The loading at the end of the desorption step can be at least about 1% of the loading at the end of the prior adsorption step, or at least about 10%, or at least about 20%, or at least about 30%, or at least about 50%, and/or about 70% or less, or about 60% or less, or about 50% or less, or about 40% or less, or about 30% or less, or about 20% or less, or about 10% or less.

The method of adsorbent regeneration designates the type of swing adsorption process. Pressure swing adsorption (PSA) processes rely on the fact that gases under pressure tend to be adsorbed within the pore structure of the microporous adsorbent materials. The higher the pressure, the greater the amount of targeted gas component that will be adsorbed. When the pressure is reduced, the adsorbed targeted component is released, or desorbed. PSA processes can be used to separate gases of a gas mixture because different gases tend to fill the micropore or free volume of the adsorbent to different extents due to either the equilibrium or kinetic properties of the adsorbent. TSA processes also rely on the fact that gases under pressure tend to be adsorbed within the pore structure of the microporous adsorbent materials. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components in a gas mixture.

Temperature swing adsorption (TSA) processes, can employ an adsorbent that is repeatedly cycled through at least two steps—an adsorption step and a thermally assisted regeneration step. Regeneration of the adsorbent can be achieved by heating the adsorbent to an effective temperature to desorb target components from the adsorbent. The adsorbent can then be cooled so that another adsorption step can be completed. Such cooling may be supplied by a cooling fluid either directly or indirectly. The temperature swing adsorption process can be conducted with rapid cycles, in which case they are referred to as rapid cycle temperature swing adsorption (RCTSA). A rapid cycle thermal swing adsorption process is defined as one in which the cycle time between successive adsorption steps is less than about 10 minutes, preferably less than about 2 minutes, for example less than about 1 minute. RC-TSA processes can be used to obtain very high product recoveries in the excess of 90 vol %, for example greater than 95 vol % or, in some cases, greater than 98 vol %. The term "adsorption" as used herein includes physisorption, chemisorption, and condensation onto a solid support, absorption into a solid supported liquid, chemisorption into a solid supported liquid, and combinations thereof.

It is noted that a TSA cycle can also typically include a change in the temperature of the adsorbent from the temperature for the adsorption step to the temperature for the desorption step. The adsorption step can be defined based on the time when the gas flow is started for the input gas containing the component for adsorption and when the gas flow is stopped. The desorption step can be defined based on the time when gas being desorbed from the adsorbent is collected to the time collection is stopped. Any time in the cycle outside of those steps can be used for additional adjustment of the adsorbent temperature.

A potential advantage of a TSA separation can be that the process can be performed at a convenient pressure, or with a small amount of variation around a convenient pressure. For example, a goal of a TSA separation can be to develop a substantially pure stream of a gas component that is adsorbed and then desorbed. In this type of aspect, a convenient pressure for the desorption step can be a temperature of about 1 bar (0.1 MPa) or less. Attempting to desorb a stream at greater than about 0.1 MPa can require substantial additional temperature increase for desorption. Additionally, ambient pressure can be a convenient pressure for the adsorption step as well, as many streams containing a gas component for adsorption can correspond to "waste" or flue gas streams that may be at low pressure. In some aspects, the pressure difference between the adsorption and desorption steps can be about 1 MPa or less, or about 0.2 MPa or less, or about 0.1 MPa or less, or about 0.05 MPa or less, or about 0.01 MPa or less.

A variety of types of solid adsorbents are available for separation of components from a gas flow using temperature swing adsorption (TSA). During a conventional TSA process, at least one component in a gas flow can be preferentially adsorbed by the solid adsorbent, resulting in a stream with a reduced concentration of the adsorbed component. The adsorbed component can then be desorbed and/or displaced from the solid adsorbent, optionally to form a stream having an increased concentration of the adsorbed component.

One of the ongoing challenges with swing adsorption processes is balancing between the desire to increase the working capacity of the adsorbent and the desire to reduce the cycle time. For an idealized process, the working capacity of an adsorbent can be increased by increasing the severity of the difference between the conditions during adsorption and desorption of a target component that is adsorbed out of a gas flow. This can correspond to increasing the difference in pressure between adsorption and desorption (typically for PSA), increasing the difference in temperature between adsorption and desorption (typically for TSA), or a combination thereof.

In practical application, the amount of pressure and/or temperature difference between adsorption and desorption can be limited by a desire to improve total cycle time. Increasing the differential in pressure and/or temperature between adsorption and desorption can cause a corresponding increase in the time required for transitioning between the adsorption and desorption portions of a cycle. This can include one or both of the transition from adsorption to desorption or the transition from desorption to adsorption.

A further complication in swing adsorption processes can be related to achieving full working capacity and/or achieving full restoration of the adsorbent monolith to a desired state prior to the next adsorption step. Equilibrium adsorption isotherms can describe the potential working capacity that may be achieved during a full swing adsorption cycle. However, achieving a desired desorption condition does not guarantee that equilibrium is reached at that condition. For example, in temperature swing adsorption, it can be desirable to reduce or minimize the desorption temperature so long as the temperature still achieves a desired amount of desorption. This can often correspond to a temperature of less than about 200° C. At such temperatures, desorption to equilibrium values may take a long time relative to a cycle time, as random fluctuations within the temperature ensemble state may be needed to achieve desorption of individual adsorbed compounds.

The problem with incomplete desorption can be further exacerbated if other fluids are present in the desorption environment. For example, one potential option for increasing the rate of temperature change during a swing adsorption process could be to use a liquid phase fluid to provide better thermal contact and/or heat capacity. However, such a fluid can potentially become trapped in the porous structures found in many adsorbents. Simply increasing the temperature of the adsorbent monolith to the desorption temperature may be insufficient to dislodge such fluids that are within the pores of the adsorbent.

In various aspects, the above difficulties with balancing the driving force for desorption with the desire for shorter cycle times can be reduced, mitigated, or minimized by not to operating the TSA process to the full capacity of the adsorbent bed. In other words, the TSA process can be used as a concentrator to form a $CO_2$-rich stream to be further separated by a second stage adsorption process. This reduces the heat of adsorption in the TSA process and also decreases the steam usage required to regenerate the adsorbent.

Displacement Adsorption/Desorption Processes

Displacement Adsorption/Desorption ("DD") processes employ gas-solids contactors in which the sorbent is alternately exposed to the feed gas and to steam wherein the gas and steam are essentially at the same temperature. In the steaming step the carbon dioxide adsorbed from the gas is released from the sorbent by a combination of concentration swing and desorptive displacement, thereby regenerating the sorbent for re-use. No external application or removal of heat is used, and the process operates at essentially constant pressure. The process is notably identifiable and distinguishable and beneficial as compared to pressure swing or partial pressure swing separation in that during the adsorption of $CO_2$ the bed temperature decreases below the average bed temperature as determined over the entire cycle and during $CO_2$ displacement/desorption the bed temperature increases above the average. The process is further distinguished and beneficial as compared to thermal swing separation in that no external heat is applied and the desorption gas, steam, is essentially isothermal with the feed gas. The gas-solids contactors may use moving solid sorbents, or solid sorbents contained in packed beds or in parallel-channel beds (monoliths). The packed bed or monoliths can be rotating or stationary. To permit continuous flow of inlet and outlet streams, multiple beds can be combined with appropriate valving to switch individual beds between adsorption and desorption. Such multiple bed arrangements can be operated to achieve counter-current staging. The water and energy from the regeneration steam can be recaptured after use and recycled back into the process.

Some DD regeneration processes use contact with steam to remove the adsorbed gas from the sorbent. The regeneration mechanism can be by a combination of concentration swing and desorptive displacement of the adsorbed gas with steam. The disclosure can further relate to a method to recycle the steam and recover its energy through a multi-stage condenser/heat exchangers system. The advantage of this option is that it increases system efficiency.

DD processes can be used for removal of $CO_2$ from a combustion flue gas or natural gas stream or other streams. An advantage is that the adsorbent can be rapidly regenerated essentially isothermally with steam and discharge a moist $CO_2$ stream wherein the $CO_2$ concentration is higher than that in the original feed gas. Another advantage of the sorbent is that it can be used in an adiabatic reactor design. The sorbent adsorbs water during regeneration with steam and then desorbs water during $CO_2$ adsorption so that the net reactions are exothermic during steaming and endothermic during adsorption. In this way the system does not require external thermal management on the adsorber and regenerator beds. This modest temperature swing is also important because it thermally assists both adsorption and desorption, again without the addition of external thermal management.

High process efficiency can be important in order for $CO_2$ capture to be economical. The regeneration system can be designed to recycle the steam and recover its energy.

The process can be carried out in a cyclic adsorption/regeneration cycle and can include various intermediate purges and stream recycles. Such a process can be performed with co-directional flow of the feed gas and regeneration steam, but can be preferably performed with counter-current feed adsorption/steam regeneration steam flows.

The process can include the steps of passing a gas stream comprising $CO_2$ over a sorbent to adsorb the $CO_2$ to the sorbent, and then recovering the $CO_2$ by desorbing the $CO_2$ from the sorbent. As noted above, and discussed in more detail below, the adsorption/desorption process can be based on concentration swing and desorptive displacement. Concentration swing adsorption (CSA) processes including the adsorption and desorption steps are governed by change in fugacity of the adsorbate, in this case, $CO_2$, in the gas stream, in comparison to the adsorbent. The adsorbate, in this case $CO_2$, is adsorbed when its fugacity is high in the gas stream and low in the adsorbent. Conversely, it is desorbed when its fugacity is reduced in the gas stream relative to the amount in the adsorbent. By way of example, an adsorbent having a high level of $CO_2$ might still adsorb additional $CO_2$ when the gas stream has a relatively higher fugacity of $CO_2$ versus the adsorbent. And an adsorbent having a low level of $CO_2$ can adsorb $CO_2$ when the gas stream has a low fugacity of $CO_2$ so long as the relative fugacity of $CO_2$ in the sorbent is still lower than the $CO_2$ in the gas stream. One of ordinary skill in the art would also recognize that "relative fugacity" does not imply relative concentration in the absolute value sense, i.e. does not mean that a 2% adsorbed $CO_2$ content is necessarily larger than a 1% $CO_2$ gas level, because the ability of the gas to retain $CO_2$ versus the ability of adsorbent to adsorb additional $CO_2$ will be governed by various equilibrium relationships.

DD processes also include desorbing the $CO_2$ from the sorbent. This step might also be referred to as a regeneration step because the sorbent is regenerated for the next passage of a $CO_2$ gas stream across the sorbent. The desorption of $CO_2$ from the sorbent comprises treating the sorbent with steam. This desorption step can be driven by a one or more forces. One desorption force is concentration swing, as with the adsorption step above. The partial pressure of $CO_2$ in the incoming steam is nearly zero, and thus the adsorbed $CO_2$ can shift to the steam phase. The second desorption force is desorption by displacement. The water molecules in the steam can adsorb onto the sorbent and displace the $CO_2$ from the sorbent.

As an optional step, the processes, methods and systems of the disclosure can also include one or more purging step, in which a non-adsorbent gas, i.e. not steam or a $CO_2$ feed stream, can be passed across the sorbent. The gas can be any gas known to one or ordinary skill in the art, such as for example an inert gas or air. In an embodiment, the purge gas can be a nitrogen stream, an air stream, or a dry air stream. Alternatively the purge gas can be a $CO_2$ feed gas or steam that is recycled into a process step. The purge step can be conducted at any time. For example, prior to the passing of the $CO_2$ feed stream across the sorbent, a purge gas can be passed to remove residual and adsorbed water vapor. This purge gas can be run back into the regeneration side in order for the water vapor to be readsorbed onto the regeneration side. The purging step can also occur between the adsorption step or steps, and the desorption or regeneration step or steps. The purge gas can be non-reactive, but can still optionally remove adsorbed $CO_2$ from a sorbent based on concentration swing. Thus, in an embodiment, the purging step can be conducted after adsorption steps, and can be conducted to remove residual gas prior to desorption, which can be optionally recycled into the process. Moreover, the purge step can also be optionally diverted into two streams: 1) an initial purge stream to remove the first gas, and 2) a separate purge stream that can contain the initial purified or desorbed $CO_2$, which could be optionally captured as part of the final product stream. Furthermore, in an embodiment, a purging step can be conducted after the desorption or regeneration step(s) is complete, thereby optionally removing residual water and/or steam which can be recycled back into the process. Each purging step can thereby reduce an excess gas stream which can, for example lead to a more efficient process or produce a more $CO_2$ enriched product stream because a final product stream is not diluted by a preceding gas source. By way of specific example, a purging step conducted after the initial adsorption can remove residual, dilute $CO_2$ feed stream, leading to a more concentrated $CO_2$ product stream. The resulting gas stream from the purging step can be recycled into the system, or split into a recycle and a product stream.

Figure 3:
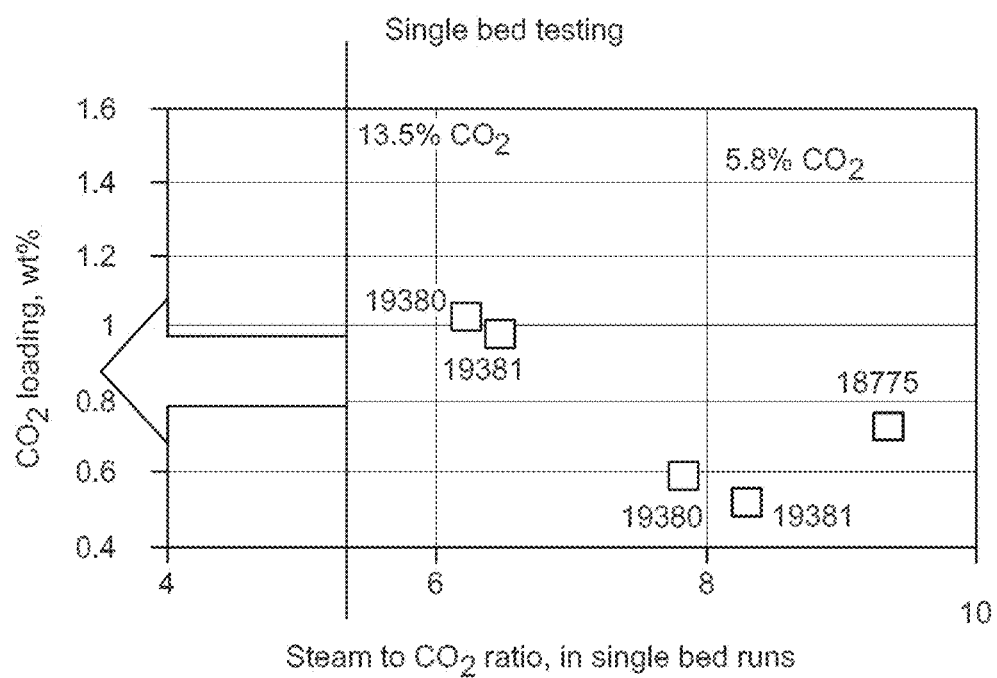
FIG. 3 shows a graph of steam usage in moles as a function of $CO_2$ concentration.

Additionally, different separations processes are more effective at different concentrations of adsorbate in a feed. Specifically, TSA processes are generally more effective at lower adsorbate concentrations, while DD processes are generally more effective at higher adsorbate concentration. For example, in FIG. 3 shows graph of steam usage in moles as a function of $CO_2$ concentration for a single stage displacement process. As shown, as $CO_2$ loading increases, the amount of steam usage decreases. In other words, displacement processes have been shown to be more efficient when there is a higher concentration of $CO_2$ in the incoming feed.

Different processes likewise have disadvantages. In DD processes when $CO_2$ concentration in the incoming feed is at lower levels, the amount of steam required to separate the $CO_2$ to an acceptable level is cost prohibitive. Regarding TSA processes, adsorption is exothermic. In many TSA adsorbents, especially in certain metal organic frameworks (MOFs), the amount of heat generated when loading the adsorbent to capacity is unacceptable. McDonald et al. (519 NATURE 303, 307) explain, "Because of the exothermic nature of all adsorption processes, the incorporation of labour and material intensive coolant pipes into an adsorbent bed (a component of the considerable infrastructure cost for carbon capture) is necessary to maintain isothermal adsorption conditions . . . . The physical size of adsorption units is dictated, to a great extent, by the need to provide sufficient contact area between the coolant and sorbent for effective heat removal."

Examples of Adsorbent Structures

In various aspects, an adsorbent structure can correspond to a contactor for use in a swing adsorption vessel. More generally, in this discussion an adsorbent structure can correspond to any type of structure, either rigid or non-rigid, that includes or incorporates an adsorbent suitable for adsorption of a gas component during a swing adsorption process. This can include conventional contactor adsorbent structures, such as parallel plate contactors, adsorbent monoliths, and other conventional structures. This can also include non-rigid structures, such as flexible, curtain-like, and/or fabric-like adsorbents that may be able to exhibit larger amplitude fluctuations in position in response to an induced vibration. Still other adsorbent structures can correspond to beds of adsorbent particles, either in a conventional adsorbent bed configuration or in a non-traditional configuration, such as use of bed of adsorbent particles under trickle flow conditions.

A variety of contactors corresponding to adsorbent structures are known, such as the contactors (adsorbent structures) described in U.S. Patent Application Publication 2008/0282892, the entirety of which is incorporated herein by reference. For example, FIG. 1 hereof is a representation of a parallel channel contactor of the present disclosure in which the parallel channels are formed from laminated sheets containing adsorbent material. Laminates, laminates of sheets, or laminates of corrugated sheets can be used in pressure and/or temperature swing adsorption processes. Laminates of sheets are known in the art and are disclosed in U.S. patent applications US20060169142 A1 and U.S. Pat. No. 7,094,275 B2. When the adsorbent is coated onto a geometric structure or components of a geometric structure that are laminated together, the adsorbent can be applied using any suitable liquid phase coating techniques. Non-limiting examples of liquid phase coating techniques that can be used in the practice of the present disclosure include slurry coating, dip coating, slip coating, spin coating, hydrothermal film formation and hydrothermal growth. When the geometric structure is formed from a laminate, the laminate can be formed from any material to which the adsorbent of the present disclosure can be coated. The coating can be done before or after the material is laminated. In all these cases the adsorbent is coated onto a material that is used for the geometric shape of the contactor. Non-limiting examples of such materials include glass fibers, milled glass fiber, glass fiber cloth, fiber glass, fiber glass scrim, ceramic fibers, metallic woven wire mesh, expanded metal, embossed metal, surface-treated materials, including surface-treated metals, metal foil, metal mesh, carbon-fiber, cellulosic materials, polymeric materials, hollow fibers, metal foils, heat exchange surfaces, and combinations of these materials. Coated supports typically have two major opposing surfaces, and one or both of these surfaces can be coated with the adsorbent material. When the coated support is comprised of hollow fibers, the coating extends around the circumference of the fiber. Further support sheets may be individual, presized sheets, or they may be made of a continuous sheet of material. The thickness of the substrate, plus applied adsorbent or other materials (such as desiccant, catalyst, etc.), typically ranges from about 10 micrometers to about 2000 micrometers, more typically from about 150 micrometers to about 300 micrometers.

Figure 2:
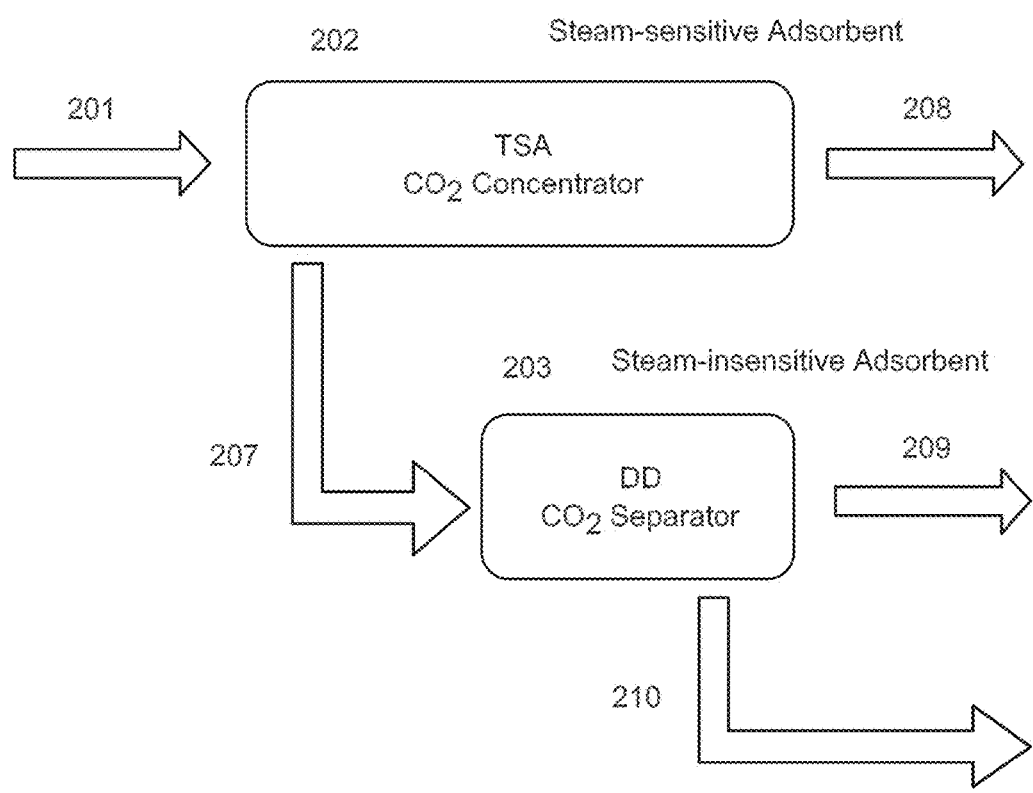
FIG. 2 shows a flow chart for a system embodying aspects of the current disclosure.

In various aspects, the present disclosure eliminates many of the inefficiencies contained in the prior art as can be seen with reference to FIG. 1 and FIG. 2. As shown therein, a two stage adsorbent contactor is provided. Gaseous stream 101 enters the first stage adsorbent 102 as shown. Gaseous stream 101 can be, for example, a flue gas from a natural gas or coal-fired power plant. Such flue gasses generally contain between 3-7 mol. % $CO_2$ (for natural gas plants) or between 10-20 mol. % $CO_2$ (for coal-fired plants). Such streams are generally between 60° C. and 90° C. and are at low pressures—i.e. 2 bar or less. First stage adsorbent 102 is preferably a steam sensitive adsorbent. Within first stage adsorbent 102, there can be a plurality of cylindrical or substantially cylindrical rings 105. Said cylindrical or substantially cylindrical rings 105 contain gas permeable walls such that gaseous stream 101 is permitted to permeate different rings 105 within first stage adsorbent 102. The first stage adsorbent 102 can be comprised of a MOF. Additionally or alternatively, the first stage adsorbent 102 is disposed radially about a central axis; wherein the first stage adsorbent has an interior surface that is a distance x from the central axis and an exterior surface that is a distance y from the central axis, wherein y is greater than x, thereby forming a void space between the central axis and the interior surface of the first stage adsorbent.

Also provided is second stage adsorbent 103. Second stage adsorbent 103 is preferably steam insensitive. Within second stage adsorbent 103, there can be a plurality of cylindrical or substantially cylindrical rings 106. Said cylindrical or substantially cylindrical rings 106 contain gas permeable walls such that a first $CO_2$-rich stream is permitted to permeate different rings 106 within second stage adsorbent 103. The second stage adsorbent 103 can comprise a support and a metal compound selected from the group consisting of alkali or alkaline earth. Additionally or alternatively, second stage adsorbent 103 is disposed within the void space of the first stage adsorbent 102 when the first stage adsorbent 102 is disposed radially about a central axis; wherein the first stage adsorbent has an interior surface that is a distance x from the central axis and an exterior surface that is a distance y from the central axis, wherein y is greater than x, thereby forming a void space between the central axis and the interior surface of the first stage adsorbent 102.

FIG. 2 illustrates an example process utilizing the apparatus described above is illustrated. Gaseous stream 201 enters first stage adsorbent 202. Gaseous stream 201 is subjected to a TSA process with first stage adsorbent 202 such that a first $CO_2$-lean stream 208 is formed during the adsorption phase, which is comprised nearly entirely of nitrogen. $CO_2$ is then desorbed from first stage adsorbent 202 using a hot purge gas thereby forming a first $CO_2$-rich stream 207. In one aspect, the $CO_2$ content of the gaseous stream 201 is between 3-20 mol. %. In another aspect, the $CO_2$ content of the first $CO_2$-rich stream 207 is about 20-35 mol. %. In another aspect, the TSA process comprises contacting the gaseous stream 201 with the first stage adsorbent 202 at a first temperature, said first temperature being less than an adsorption temperature of $CO_2$ for the first stage adsorbent 202, heating the first stage adsorbent 202 with a hot purge gas, wherein the hot purge gas is at a second temperature, said second temperature being greater than a desorption temperature of $CO_2$ for the first stage adsorbent 202. In another aspect of the TSA process the hot purge gas comprises $N_2$, $CO_2$, or flare gas, such as methane. In another aspect of the TSA process, the temperature differential between the first temperature and the second temperature is less than 90° C., less than 70° C., less than 50° C., less than 30° C., or less than 20° C. In another aspect, the first stage adsorbent 202 is heated by the hot purge gas by indirect heat exchange.

In another aspect, the method comprises contacting the first $CO_2$-rich stream 207 with a second stage adsorbent 203 such that $CO_2$ is adsorbed in the second stage adsorbent 203 and a second $CO_2$-lean 209 stream is formed. In another aspect, the method comprises desorbing $CO_2$ from the second stage adsorbent thereby forming a second $CO_2$-rich stream 210; wherein the second $CO_2$-rich stream 210 has a higher $CO_2$ concentration by mol. % than the first $CO_2$-rich stream 207.

As shown in FIG. 2, the contacting the first $CO_2$-rich stream 207 and the desorbing $CO_2$ from the second stage adsorbent 203 steps are performed using a displacement process, wherein the displacement process comprises, contacting the first $CO_2$-rich stream 207 with the second stage adsorbent 203 such that $CO_2$ is adsorbed into the second stage adsorbent 203; and contacting the second stage adsorbent 203 with steam such that $CO_2$ is desorbed from the second stage adsorbent 203. In another aspect, $CO_2$ is desorbed from the second stage adsorbent 203 via one or both of concentration swing and displacement desorption. In another aspect, the displacement process is conducted at an initial temperature; wherein the initial temperature does not vary more than 10° C. during the contacting the first $CO_2$-rich stream with the second stage adsorbent 203 and the contacting the second stage adsorbent 203 with steam steps.

In another aspect, the temperature swing process and displacement process described above are used as the first and second stage adsorption/desorption processes, respectively. In another aspect, the ratio of steam usage in moles to $CO_2$ recovered in moles is less than 3. In another aspect, the heat of condensation from the $CO_2$ that is desorbed from the second stage adsorbent is used to heat the gaseous stream.

With reference to FIG. 1, it is to be understood that the flow path of the various feed and product streams disclosed herein, such as those depicted in as product streams 104, and the associated headers, valve manipulations, etc. would be readily recognizable to one of ordinary skill in the art. Accordingly, such mechanisms are not shown in the figures for simplicity.

Additional Embodiments

Additionally or alternatively, the present disclosure can include one or more of the following embodiments.

Embodiment 1

An adsorbent contactor for separation of $CO_2$ from a gaseous stream, comprising a first stage adsorbent, said first stage adsorbent being steam sensitive; and a second stage adsorbent, said second stage adsorbent being steam insensitive.

Embodiment 2

The adsorbent contactor of embodiment 1, wherein the first stage adsorbent comprises a metal organic framework.

Embodiment 3

The adsorbent contactor of embodiment 1 or 2, wherein the second stage adsorbent comprises a support and a metal compound selected from the group consisting of alkali or alkaline earth.

Embodiment 4

The adsorbent contactor of any of the previous embodiments, wherein the first stage adsorbent is disposed radially about a central axis; wherein the first stage adsorbent has an interior surface that is a distance x from the central axis and an exterior surface that is a distance y from the central axis, wherein y is greater than x, thereby forming a void space between the central axis and the interior surface of the first stage adsorbent.

Embodiment 5

The adsorbent contactor of embodiment 4, wherein the second stage adsorbent is disposed within the void space of the first stage adsorbent.

Embodiment 6

The adsorbent contactor of any of the previous embodiments, wherein the first stage adsorbent and the second stage adsorbents comprise a plurality of cylindrical or substantially cylindrical adsorbent beds, wherein the walls of the plurality of cylindrical or substantially cylindrical adsorbent beds are gas permeable.

Embodiment 7

The adsorbent contactor of any of the previous embodiments, wherein the first stage adsorbent comprises a metal organic framework and the second stage adsorbent comprises a support and a metal compound selected from the group consisting of alkali or alkaline earth.

Embodiment 8

A method for separation of $CO_2$ from a gaseous stream, comprising contacting the gaseous stream with a first stage steam sensitive adsorbent such that $CO_2$ is adsorbed into the first stage adsorbent and a first $CO_2$-lean stream is formed; desorbing $CO_2$ from the first stage adsorbent thereby forming a first $CO_2$-rich stream; contacting the first $CO_2$-rich stream with a second stage steam insensitive adsorbent such that $CO_2$ is adsorbed in the second stage adsorbent and a second $CO_2$-lean stream is formed; and desorbing $CO_2$ from the second stage adsorbent thereby forming a second $CO_2$-rich stream; wherein the second $CO_2$-rich stream has a higher $CO_2$ concentration by mol. % than the first $CO_2$-rich stream.

Embodiment 9

The method of embodiment 8, wherein the first stage adsorbent consists of a metal organic framework.

Embodiment 10

The method of embodiment 8 or 9, wherein the second stage adsorbent comprises a support and a metal compound selected from the group consisting of alkali or alkaline earth.

Embodiment 11

The method of any of embodiments 8-10, wherein the contacting the gaseous stream and the desorbing $CO_2$ from the first stage adsorbent steps are performed using a temperature swing process.

Embodiment 12

The method of any of embodiments 8-11, wherein the contacting the first $CO_2$-rich stream and the desorbing $CO_2$ from the second stage adsorbent steps are performed using a displacement process.

Embodiment 13

The method of any of embodiments 8-12, wherein the pressure of the gaseous stream is less than 2 bar.

Embodiment 14

The method of any of embodiments 8-13, wherein the temperature of the gaseous stream is between about 60° C. and 90° C.

Embodiment 15

The method of any of embodiments 8-14, wherein the temperature swing process comprises, contacting the gaseous stream with the first stage adsorbent at a first temperature, said first temperature being less than an adsorption temperature of $CO_2$ for the first stage adsorbent, heating the first stage adsorbent with a hot purge gas, wherein the hot purge gas is at a second temperature, said second temperature being greater than a desorption temperature of $CO_2$ for the first stage adsorbent.

Embodiment 16

The method of embodiment 15, wherein the hot purge gas comprises $N_2$.

Embodiment 17

The method of embodiments 15 or 16, wherein the hot purge gas comprises $N_2$ and $CO_2$.

Embodiment 18

The method of any of embodiments 15-17, wherein the hot purge gas comprises flare gas, such as methane.

Embodiment 19

The method of any of embodiments 15-18, wherein the first stage adsorbent is heated by the hot purge gas by indirect heat exchange.

Embodiment 20

The method of embodiment 15, wherein the temperature differential between the first temperature and the second temperature is less than 90° C.

Embodiment 21

The method of embodiment 15, wherein the temperature differential between the first temperature and the second temperature is less than 70° C.

Embodiment 22

The method of embodiment 15, wherein the temperature differential between the first temperature and the second temperature is less than 50° C.

Embodiment 23

The method of embodiment 15, wherein the temperature differential between the first temperature and the second temperature is less than 30° C.

Embodiment 24

The method of embodiment 12, wherein the displacement process comprises, contacting the first $CO_2$-rich stream with the second stage adsorbent such that $CO_2$ is adsorbed into the second stage adsorbent; and contacting the second stage adsorbent with steam such that $CO_2$ is desorbed from the second stage adsorbent.

Embodiment 25

The method of any of embodiments 12-24, wherein $CO_2$ is desorbed from the second stage adsorbent via one or both of concentration swing and displacement desorption.

Embodiment 26

The method of any of embodiments 12-24, wherein the displacement process is conducted at an initial temperature; wherein the initial temperature does not vary more than 10° C. during the contacting the first $CO_2$-rich stream with the second stage adsorbent and the contacting the second stage adsorbent with steam steps.

Embodiment 27

The method of embodiment 11, wherein the contacting the first $CO_2$-rich stream and the desorbing $CO_2$ from the second stage adsorbent steps are performed using a displacement process; wherein the displacement process comprises, contacting the first $CO_2$-rich stream with the second stage adsorbent such that $CO_2$ is adsorbed into the second stage adsorbent; contacting the second stage adsorbent with steam such that $CO_2$ is desorbed from the second stage adsorbent.

Embodiment 28

The method of any of embodiments 8-27, wherein the steam usage in moles to $CO_2$ desorbed in moles ratios is less than 3.

Embodiment 29

The method of any of embodiments 8-28, wherein the first the first stage adsorbent is disposed radially about a central axis; wherein the first stage adsorbent has an interior surface that is a distance x from the central axis and an exterior surface that is a distance y from the central axis, wherein y is greater than x, thereby forming a void space between the central axis and the interior surface of the first stage adsorbent.

Embodiment 30

The method of any of embodiments 8-29, wherein the second stage adsorbent is disposed within the void space of the second stage adsorbent.

Embodiment 31

The method of any of embodiments 8-30, wherein the heat of condensation from the $CO_2$ that is desorbed from the second stage adsorbent is used to heat the gaseous stream.

Embodiment 32

The method of any of embodiments 8-31, wherein the $CO_2$ content in the gaseous stream is about 3-10 mol. %.

Embodiment 33

The method of any of embodiments 8-32, wherein the $CO_2$ content in the first $CO_2$-rich stream is about 20-35 mol. %.

Embodiment 34

A system for separation of $CO_2$ from a gaseous stream, comprising; a first stage adsorbent, said first stage adsorbent being steam sensitive; wherein said first adsorbent is subject to a temperature swing process, said temperature swing process comprising, contacting the gaseous stream with the first stage adsorbent at a first temperature, said first temperature being less than an adsorption temperature of $CO_2$ for the first stage adsorbent, heating the first stage adsorbent with a hot purge gas, wherein the hot purge gas is at a second temperature, said second temperature being greater than a desorption temperature of $CO_2$ for the first stage adsorbent, thereby forming a first $CO_2$-rich stream and a first $CO_2$-lean stream; a second stage adsorbent, said second stage adsorbent being steam insensitive; wherein said second stage adsorbent is subject to a displacement process, said displacement process comprising, contacting the first $CO_2$-rich stream with the second stage adsorbent such that $CO_2$ is adsorbed into the second stage adsorbent; contacting the second stage adsorbent with steam such that $CO_2$ is desorbed from the second stage adsorbent, thereby forming a second $CO_2$-rich stream and a second $CO_2$-lean stream; wherein the second $CO_2$-rich stream has a higher $CO_2$ concentration by mol. % than the first $CO_2$-rich stream.

Embodiment 35

The system of embodiment 34, wherein the first stage adsorbent is disposed radially about a central axis; wherein the first stage adsorbent has an interior surface that is a distance x from the central axis and an exterior surface that is a distance y from the central axis, wherein y is greater than x, thereby forming a void space between the central axis and the interior surface of the first stage adsorbent.

Embodiment 36

The system of embodiment 34 and 35, wherein the second stage adsorbent is disposed within the void space of the first stage adsorbent.

Embodiment 37

The system any of embodiments 34-36, wherein the first stage adsorbent and the second stage adsorbents comprise a plurality of cylindrical or substantially cylindrical adsorbent beds, wherein the walls of the plurality of cylindrical or substantially cylindrical adsorbent beds are gas permeable.

Although the present disclosure has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the disclosure.

Examples of $CO_2$ Concentration in First Stage Adsorben

The following calculations are based on sophisticated modeling techniques, which mimic $CO_2$ concentration that would occur during a first stage adsorption process of the present disclosure.

Example 1

A high capacity MOF adsorbent was subjected to a thermal swing cycle which consisted of the consecutive steps of feeding a bed of said adsorbent with dimensions 1 sq. m cross-section and 2 m length, with 0.045 kg/s of flue gas containing 6% CO2 at 80° C. for 150 s, regenerating with countercurrent hot $N_2$ at 120 deg C. for 180 s followed by cooling with countercurrent $N_2$ at 80 deg C. for 60 s. The process is made continuous by using 3 beds that are run out of phase with each other, such that one bed is one feed while the other two beds are being either regenerated or cooled. Computer simulations of the cyclic process, using properties of the specified MOF adsorbent show that a combined product from both heating and cooling steps containing 22.7% $CO_2$ is produced. Simultaneously a purified $N_2$ product (or green flue gas) is produced containing 99.9% $N_2$. The recovery of the $CO_2$ is ~98.3% from this first stage of the hybrid contactor.

|  | Feed | Heat | Cool | $N_2$ product | $CO_2$ product |
|---|---|---|---|---|---|
| Moles | 232.97 | 38.53 | 10.71 | 221.10 | 60.63 |
| $CO_2$ fraction | 0.060 | 0.001 | 0.000 | 0.001 | 0.227 |
| $N_2$ fraction | 0.940 | 0.999 | 1.000 | 0.999 | 0.773 |

Example 2

A high capacity MOF adsorbent was subjected to a thermal swing cycle which consisted of the consecutive steps of feeding a bed of said adsorbent with dimensions 1 sq. m cross-section and 2 m length, with 0.04 kg/s of flue gas containing 6% $CO_2$ at 70 deg C. for 180 s, regenerating with countercurrent hot $N_2$ at 110 deg C. for 240 s followed by cooling with countercurrent $N_2$ at 70 deg C. for 120 s. The process is made continuous by using 3 beds that are run out of phase with each other, such that one bed is one feed while the other two beds are being either regenerated or cooled. Computer simulations of the cyclic process, using properties of the specified MOF adsorbent show that a combined product from both heating and cooling steps containing 22.2% $CO_2$ is produced. Simultaneously a purified $N_2$ product (or green flue gas) is produced containing 99.9% $N_2$. The recovery of the $CO_2$ is ~99.9% from this first stage of the hybrid contactor.

|  | Feed | Heat | Cool | $N_2$ product | $CO_2$ product |
|---|---|---|---|---|---|
| Moles | 248.51 | 34.25 | 21.42 | 236.22 | 67.68 |
| $CO_2$ fraction | 0.060 | 0.001 | 0.000 | 0.0004 | 0.222 |
| $N_2$ fraction | 0.940 | 0.999 | 1.000 | 0.999 | 0.778 |

Example 3

A high capacity MOF adsorbent was subjected to a thermal swing cycle which consisted of the consecutive steps of feeding a bed of said adsorbent with dimensions 1 sq. m cross-section and 2 m length, with 0.045 kg/s of flue gas containing 6% $CO_2$ at 80 deg C. for 150 s, regenerating with countercurrent hot $N_2$ at 120 deg C. for 240 s followed by cooling with countercurrent $N_2$ at 80 deg C. for 60 s. The process is made continuous by using 3 beds that are run out of phase with each other, such that one bed is one feed while the other two beds are being either regenerated or cooled. Computer simulations of the cyclic process, using properties of the specified MOF adsorbent show that a combined product from both heating and cooling steps containing 22.2% $CO_2$ is produced. Simultaneously a purified N2 product (or green flue gas) is produced containing 99.8% $N_2$. The recovery of the $CO_2$ is ~97.1% from this first stage of the hybrid contactor.

|  | Feed | Heat | Cool | $N_2$ product | $CO_2$ product |
|---|---|---|---|---|---|
| Moles | 232.97 | 38.53 | 10.70 | 220.97 | 61.23 |
| $CO_2$ fraction | 0.060 | 0.001 | 0.001 | 0.0018 | 0.222 |
| $N_2$ fraction | 0.940 | 0.999 | 0.999 | 0.998 | 0.778 |

Example 4

A lower capacity MOF adsorbent was subjected to a thermal swing cycle which consisted of the consecutive steps of feeding a bed of said adsorbent with dimensions 1 sq. m cross-section and 3 m length, with 0.02 kg/s of flue gas containing 6% $CO_2$ at 80 deg C. for 180 s, regenerating with concurrent hot $CO_2/N_2$ mixture at 100 deg C. for 90 s followed by concurrent hot $CO_2/N_2$ mixture at 130 deg C. for 90 s, subsequently conducting countercurrent pure $N_2$ at 130 deg C. for 90 s, followed by cooling with countercurrent $N_2$ for 90 s. The process is made continuous by using 3 beds that are run out of phase with each other, such that one bed is one feed while the other two beds are being either regenerated or cooled. Computer simulations of the cyclic process, using properties of the specified lower capacity MOF adsorbent (ref. 2) show that a combined product from all staged the three staged heating steps and the cooling step contains 33.4% $CO_2$. Simultaneously a purified $N_2$ product (or green flue gas) is produced containing 99.4% $N_2$. The recovery of the $CO_2$ is ~86.5% from this first stage of the hybrid contactor after accounting for the amounts of 50% $CO_2/N_2$ streams used in the staged heating steps which are recycled into the process.

|  | Feed | Heat-1 | Heat-2 | Heat-3 | Cool | $N_2$ product | $CO_2$ product |
|---|---|---|---|---|---|---|---|
| Moles | 124.25 | 24.99 | 24.99 | 64.25 | 32.13 | 176.32 | 94.13 |
| $CO_2$ fraction | 0.06 | 0.5 | 0.5 | 0.000 | 0.000 | 0.006 | 0.334 |
| $N_2$ fraction | 0.94 | 0.5 | 0.5 | 1.000 | 1.000 | 0.994 | 0.666 |

Example 5

A high capacity MOF adsorbent was subjected to a thermal swing cycle which consisted of the consecutive steps of feeding a bed of said adsorbent with dimensions 1 sq. m cross-section and 2.5 m length, with 0.03 kg/s of flue gas containing 14% $CO_2$ at 100 deg C. for 60 s, regenerating with countercurrent hot $N_2$ at 120 deg C. for 120 s followed by cooling with countercurrent $N_2$ at 100 deg C. for 60 s. The process is made continuous by using 4 beds that are run out of phase with each other, such that one bed is one feed while the other two beds are being either regenerated or cooled. Computer simulations of the cyclic process, using properties of the specified MOF adsorbent show that a combined product from both heating and cooling steps containing 20.3% $CO_2$ is produced. Simultaneously a purified $N_2$ product (or green flue gas) is produced containing 99.93% $N_2$. The recovery of the $CO_2$ is ~98.3% from this first stage of the hybrid contactor.

|  | Feed | Heat | Cool | $N_2$ product | $CO_2$ product |
|---|---|---|---|---|---|
| Moles | 59.50 | 25.69 | 10.70 | 54.70 | 40.34 |
| $CO_2$ fraction | 0.140 | 0.001 | 0.001 | 0.0007 | 0.203 |
| $N_2$ fraction | 0.860 | 0.999 | 0.999 | 0.9993 | 0.797 |

What is claimed is:

1. A method for separation of $CO_2$ from a gaseous stream, comprising
    contacting the gaseous stream with a first stage steam sensitive adsorbent such that $CO_2$ is adsorbed into the first stage adsorbent and a first $CO_2$-lean stream is formed;
    desorbing $CO_2$ from the first stage adsorbent thereby forming a first $CO_2$-rich stream;
    contacting the first $CO_2$-rich stream with a second stage steam insensitive adsorbent such that $CO_2$ is adsorbed in the second stage adsorbent and a second $CO_2$-lean stream is formed; and
    desorbing $CO_2$ from the second stage adsorbent thereby forming a second $CO_2$-rich stream; wherein the second $CO_2$-rich stream has a higher $CO_2$ concentration by mol. % than the first $CO_2$-rich stream.

2. The method of claim 1, wherein the first stage adsorbent consists of a metal organic framework.

3. The method of claim 1, wherein the second stage adsorbent comprises a support and a metal compound selected from the group consisting of alkali or alkaline earth.

4. The method of claim 1, wherein the contacting the gaseous stream and the desorbing $CO_2$ from the first stage adsorbent steps are performed using a temperature swing process.

5. The method of claim 1, wherein the contacting the first $CO_2$-rich stream and the desorbing $CO_2$ from the second stage adsorbent steps are performed using a displacement process.

6. The method of claim 1, wherein the pressure of the gaseous stream is less than 2 bar.

7. The method of claim 1, wherein the temperature of the gaseous stream is between about 60° C. and 90° C.

8. The method of claim 4, wherein the temperature swing process comprises, contacting the gaseous stream with the first stage adsorbent at a first temperature, said first temperature being less than an adsorption temperature of $CO_2$ for the first stage adsorbent, heating the first stage adsorbent with a hot purge gas, wherein the hot purge gas is at a second temperature, said second temperature being greater than a desorption temperature of $CO_2$ for the first stage adsorbent.

9. The method of claim 8, wherein the hot purge gas comprises $N_2$.

10. The method of claim 8, wherein the hot purge gas comprises $N_2$ and $CO_2$.

11. The method of claim 8, wherein the hot purge gas comprises flare gas.

12. The method of claim 8, wherein the first stage adsorbent is heated by the hot purge gas by indirect heat exchange.

13. The method of claim 8, wherein the temperature differential between the first temperature and the second temperature is less than 90° C.

14. The method of claim 8, wherein the temperature differential between the first temperature and the second temperature is less than 70° C.

15. The method of claim 8, wherein the temperature differential between the first temperature and the second temperature is less than 50° C.

16. The method of claim 8, wherein the temperature differential between the first temperature and the second temperature is less than 30° C.

17. The method of claim 5, wherein the displacement process comprises, contacting the first $CO_2$-rich stream with the second stage adsorbent such that $CO_2$ is adsorbed into the second stage adsorbent; and contacting the second stage adsorbent with steam such that $CO_2$ is desorbed from the second stage adsorbent.

18. The method of claim 17, wherein $CO_2$ is desorbed from the second stage adsorbent via one or both of concentration swing and displacement desorption.

19. The method of claim 17, wherein the displacement process is conducted at an initial temperature; wherein the initial temperature does not vary more than 10° C. during the contacting the first $CO_2$-rich stream with the second stage adsorbent and the contacting the second stage adsorbent with steam steps.

20. The method of claim 5, wherein the contacting the first $CO_2$-rich stream and the desorbing $CO_2$ from the second stage adsorbent steps are performed using a displacement process; wherein the displacement process comprises, contacting the first $CO_2$-rich stream with the second stage adsorbent such that $CO_2$ is adsorbed into the second stage adsorbent; contacting the second stage adsorbent with steam such that $CO_2$ is desorbed from the second stage adsorbent.

21. The method of claim 20, wherein the steam usage in moles to $CO_2$ desorbed in moles ratios is less than 3.

22. The method of claim 1, wherein the first the first stage adsorbent is disposed radially about a central axis; wherein the first stage adsorbent has an interior surface that is a distance x from the central axis and an exterior surface that is a distance y from the central axis, wherein y is greater than x, thereby forming a void space between the central axis and the interior surface of the first stage adsorbent.

23. The method of claim 22, wherein the second stage adsorbent is disposed within the void space of the second stage adsorbent.

24. The method of claim 20, wherein the heat of condensation from the $CO_2$ that is desorbed from the second stage adsorbent is used to heat the gaseous stream.

25. The method of claim 1, wherein the $CO_2$ content in the gaseous stream is about 3-10 mol. %.

26. The method of claim 1, wherein the $CO_2$ content in the first $CO_2$-rich stream is about 20-35 mol. %.

* * * * *